United States Patent [19]
Klujber

[11] Patent Number: 5,431,535
[45] Date of Patent: Jul. 11, 1995

[54] FOREIGN MATTER DIVERTER SYSTEMS FOR TURBOFAN ENGINES

[75] Inventor: Frank Klujber, Redmond, Wash.

[73] Assignee: The Boeing Company, Seattle, Wash.

[21] Appl. No.: 583,490

[22] Filed: Sep. 17, 1990

Related U.S. Application Data

[63] Continuation of Ser. No. 446,293, Dec. 5, 1989, abandoned.

[51] Int. Cl.6 .................. F03B 11/08; F04D 29/70
[52] U.S. Cl. .................. 415/121.2; 415/151
[58] Field of Search .............. 415/121.2, 182.1, 183; 415/77, 185, 191, 208.1, 218.1, 219.1, 914

[56] References Cited

U.S. PATENT DOCUMENTS

| | | | |
|---|---|---|---|
| 2,802,618 | 8/1957 | Prachar | 415/121.2 |
| 3,362,155 | 1/1968 | Driscoll | 415/121.2 |
| 3,720,045 | 3/1973 | Murphy | 415/121.2 |
| 4,070,827 | 1/1978 | Vanfleet et al. | 415/121.2 |
| 4,261,168 | 4/1981 | Grigorian et al. | 415/121.2 |
| 4,527,387 | 7/1985 | Lastrina et al. | 415/121.2 |
| 4,900,222 | 2/1990 | Meng et al. | 415/914 |

*Primary Examiner*—Edward K. Look
*Assistant Examiner*—Hoang Nguyen
*Attorney, Agent, or Firm*—Delbert J. Barnard; Joan H. Pauly

[57] ABSTRACT

The axial gap (30) between a turbofan section (18) in a turbofan aircraft engine (10) is enlarged so that foreign matter thrown radially outwardly by the fan blades (48) will travel vectors (52, 54) which are located forwardly of the forward boundary (28) of the splitter wall (26). This results in the foreign matter being expelled through the fan duct (14) the engine (10), preventing it from entering into the engine core (20). Forward extensions (56, 58) of the fan blades can also be used for shifting the vectors (52, 54) forwardly. Smaller forward extensions (56, 58) can be used in combination with a partially widened gap (30) for positioning the vectors (52, 54) forwardly of the splitter wall forward boundary (28).

8 Claims, 3 Drawing Sheets

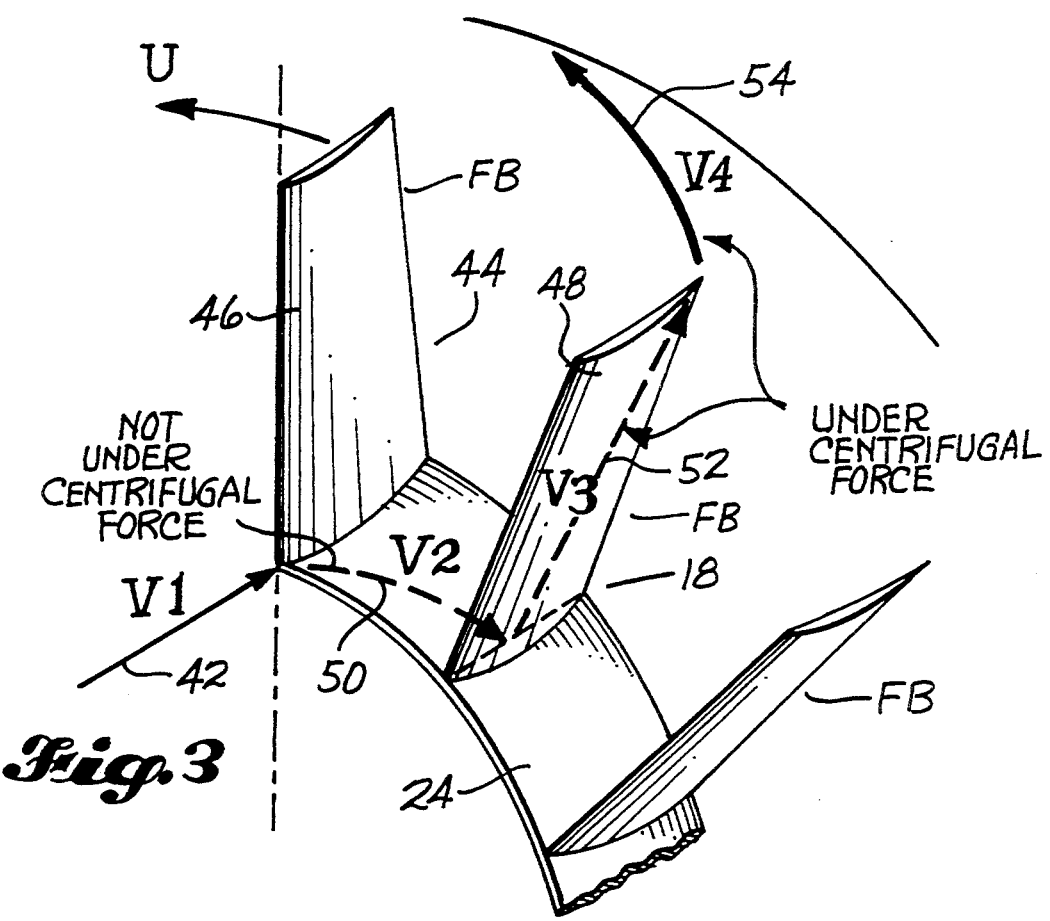
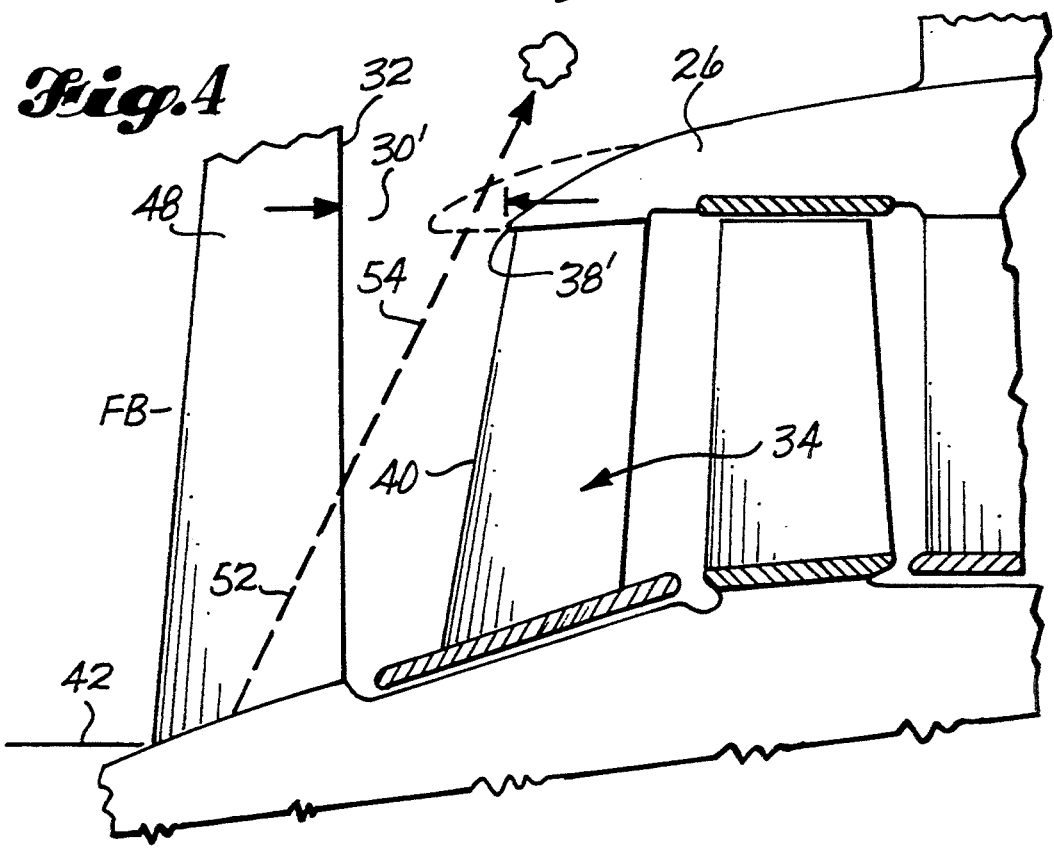

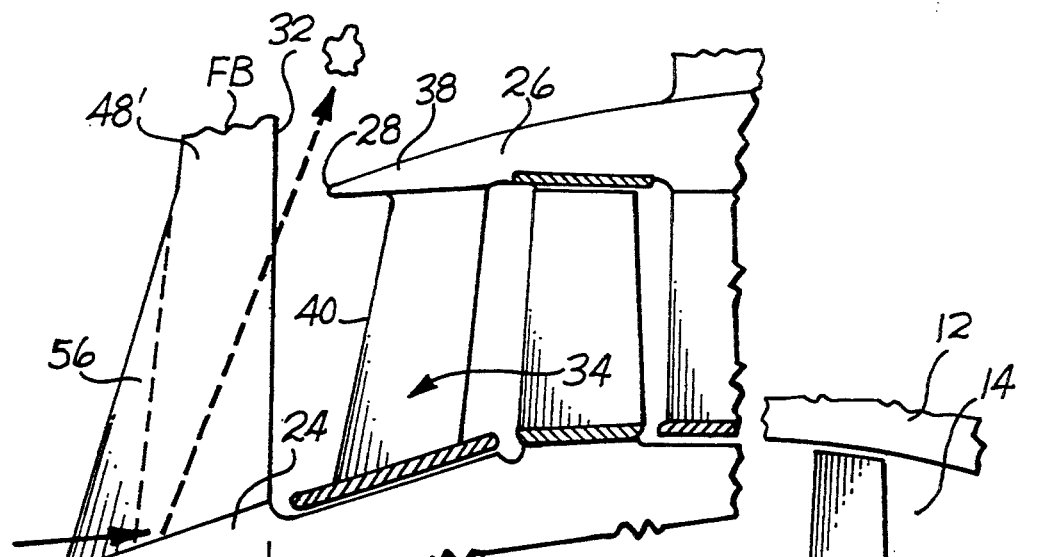
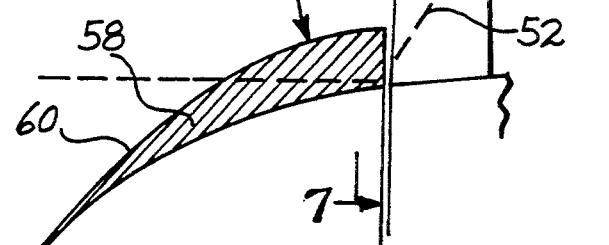
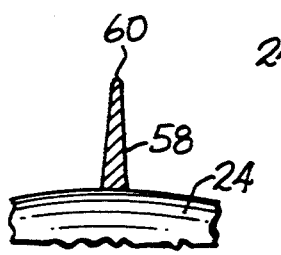
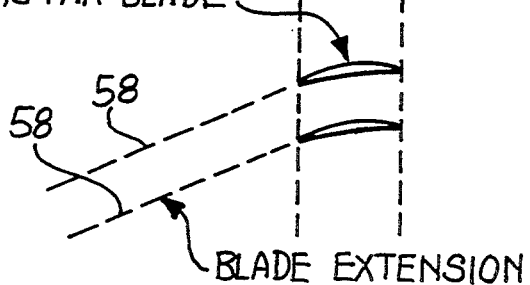

FOREIGN MATTER DIVERTER SYSTEMS FOR TURBOFAN ENGINES

RELATED APPLICATION

This application is a continuation of application Ser. No. 07/446,293, filed Dec. 5, 1989, and entitled Foreign Matter Diverter Systems For Turbofan Engines, now abandoned.

TECHNICAL FIELD

This invention relates to turbofan type aircraft engines. More particularly, it relates to the provision of fan blade and engine core inlet geometry for such engines which is adopted to divert foreign matter (e.g. water, snow, slush, ice, gravel, dirt, etc.) radially outwardly into the fan duct upstream of the inlet to the engine core, to in that manner prevent entry of such matter into the engine core.

BACKGROUND INFORMATION

The entry of foreign matter into an aircraft engine can cause damage to engine components resulting in engine performance degradation. Large particles of ice or gravel can cause instant measurable performance degradation. Smaller particles will cause erosion which in turn causes measurable performance degradation over longer periods of time. In a turbofan or bypass engine the most serious foreign matter damage occurs when the foreign matter enter the engine core. Major increases in fuel consumption result from foreign object damage and foreign matter caused wear to the compressor and turbine parts in the engine core. Also, the ingestion of water, snow, slush, ice, etc. into the engine core can cause engine flame out. Herein the term "foreign matter" is used to denote any objects or particles matter having the capability of causing wear or damage, or a flame out, if allowed entry into the core section of the engine, including gravel, dirt, ice, slush, snow, and water.

It is well known that unrestrained particles with tangential velocity move outward of are centrifuged away from the center of rotation. This invention involves choosing engine fan geometry on new designs or modifying by adding hardware to existing engines which will impart tangential velocity early enough to centrifuge particles outside the capture area of the engine core, or altering the existing design to increase the axial space between the fan rotor and the core inlet lip.

A particle which enters a rotating fan is accelerated in the tangential direction and hence is also accelerated in the radial direction. If the axial travel between the point where angular and radial accelerations are imparted to the particle and the lip of the core engine inlet (or splitter between the core and fan duct) is long enough, the particle will travel far enough radially to miss the core and exit through the fan duct. This invention uses these principles to design new engines or modify existing engines to dramatically reduce core FOD and resulting engine deterioration. It also will increase the potential for operating airplanes on "dirty runways" such as for military applications.

DISCLOSURE OF THE INVENTION

According to a first embodiment of the invention, a conventional turbofan is employed and the forward boundary of the splitter wall is offset rearwardly of its customary position so as to create a gap between said turbofan and the forward boundary of the splitter wall which is of sufficient length to permit foreign matter thrown outwardly by the turbofan to pass through said gap into the fan duct. According to a second embodiment of the invention, the base portions of the fan blades immediately axially forwardly of the engine core inlet are designed to cause an impacting with the foreign matter at a location forward enough that said matter will be thrown outwardly by the turbofan along a path that is forwardly of the forward boundary of the splitter wall. According to a third embodiment of the invention, a conventional turbofan is employed but fan extensions are provided on the rotor bulb forwardly of the fan blades and such blade extensions are configured to act on foreign matter entering into the engine and start the radially outward movement of the matter early enough so that such foreign matter will be expelled out through the fan duct and not enter the engine core. Additional features, advantages and objects of the invention are described in the detail description of the Best Mode. Such detailed descriptions and the claims which follow are both a part of the Description of the Invention.

BRIEF DESCRIPTION OF THE DRAWINGS

In the drawings, like element designations refer to like parts throughout the several views, and:

FIG. 3 is a fragmentary pictorial view looking towards three adjacent fan blades and the forward boundary of the splitter wall, such view showing the path of travel of a foreign object which first flows axially into a space between adjacent fan blades, at the base of the leading blade;

FIG. 4 is a view like FIG. 2 but showing an embodiment of the invention in which the leading boundary of the splitter wall is moved rearwardly so that a foreign object traveling the path illustrated by FIG. 3 will pass in front of the splitter wall, outwardly into the fan duct, and not be carried into the engine core;

FIG. 5 is a view like FIGS. 2 and 4, but of a second embodiment of the invention, in which the base portion of each fan blade is extended forwardly, such view showing a foreign object traveling a path of travel located forwardly of the forward boundary of the splitter wall; and FIG. 6 is a fragmentary axial sectional view of a third embodiment of the invention, in which a foreign object diverting fan blade extension is added to the nose section of the rotor forwardly of the turbofan blade; and FIG. 7 is a fragmentary sectional view taken substantially along line 7—7 of FIG. 6.

BEST MODES FOR CARRYING OUT THE INVENTION

Figure 1:
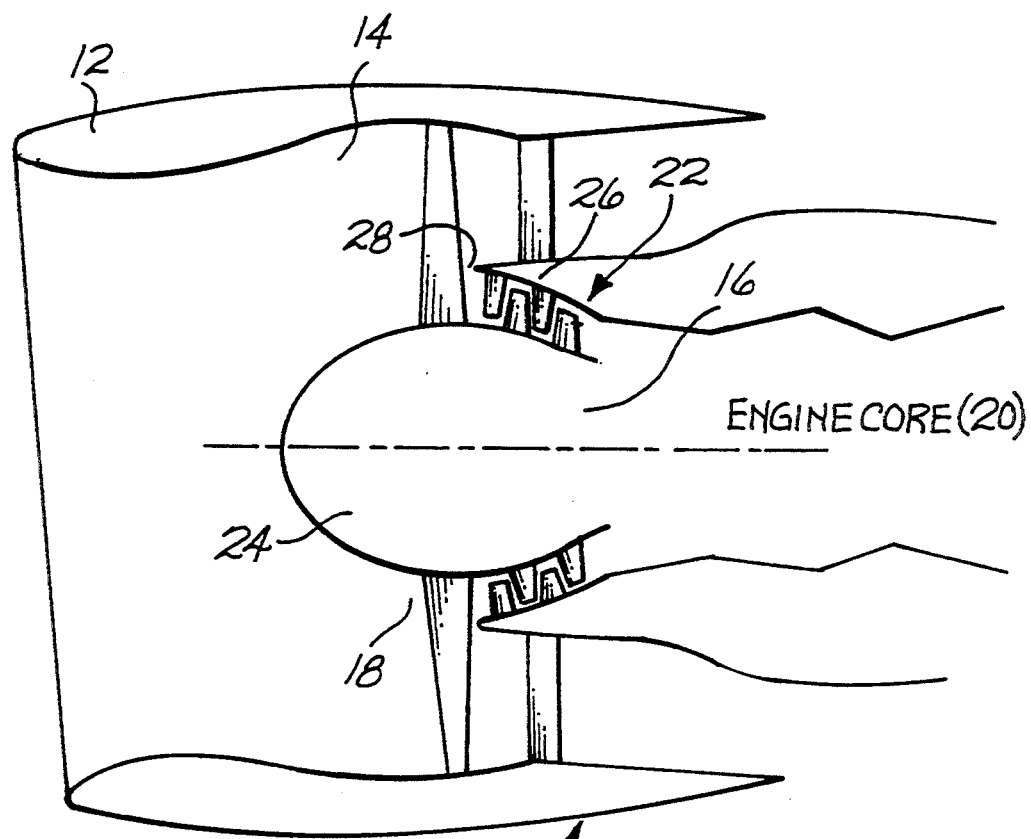
FIG. 1 is a somewhat schematic axial sectional view of the forward portion of a turbofan aircraft engine, with an after portion of the engine core broken away and internal details of the core omitted.

As will be recognized by persons skilled in the aircraft engine art, FIG. 1 is an axial sectional view of the forward portion of a turbofan aircraft engine 10 (e.g. a JT9D engine). Engine 10 includes a cowling 12 which defines a fan duct 14 and a rotor 16. Rotor 16 includes a fan blade section 18 which is positioned immediately upstream of the engine core 20. The engine core 20 includes a compressor section 22, followed by a combustion chamber section (not shown) which is in turn followed by a turbine section (not shown). Rotor 16 also includes a forward bulb portion 24 which is disposed forwardly of the fan blade section 18. An annular splitter wall 26 divides flow between the fan duct 14 and the engine core 20. Splitter wall 26 includes a forward boundary 28.

Figure 2:
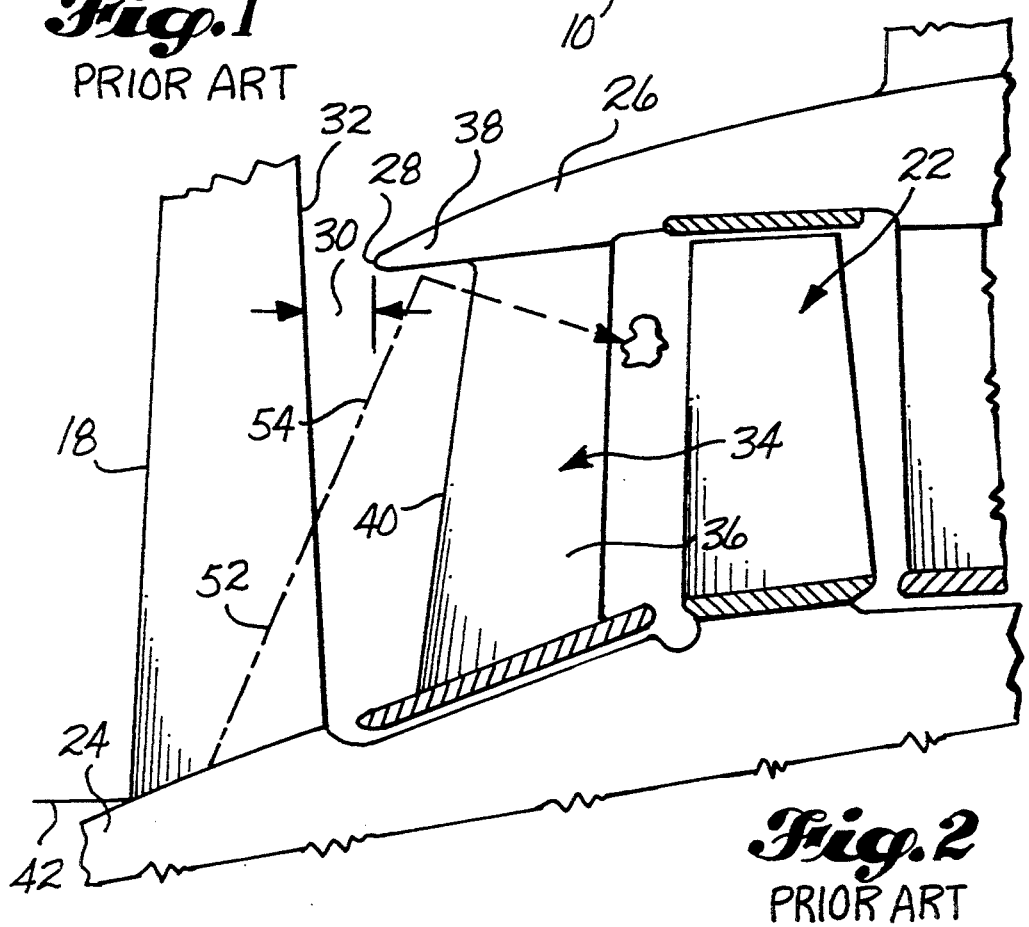
FIG. 2 is an enlarged scale fragmentary axial sectional view in the region of the fan blades and the inlet to the engine core, such view showing a foreign object being carried into the engine core.

In accordance with conventional design practice, a relatively short axial running clearance gap 30 (FIG. 2) is provided between the rear boundary 32 of the fan section 18 and the forward boundary 28 of the splitter wall 26. The splitter wall 26 supports the stator blades of the compressor 22. In FIG. 2 the forward stator blade section is designated 34. The stator blades 36 of this section 34 are, in known fashion, attached at their outer ends to a portion of the splitter wall 26. In accordance with conventional design practice, an annular lip 38 projects forwardly from the forward boundary 40 of stator blade section 34. This lip 38 is an aerodynamic member. It serves to start the separation of the airstream entering the engine 10 into an inner stream which enters into the engine core and an outer bypass stream which flows rearwardly through the fan duct 14.

As has been explained above, foreign matter such as gravel, dirt, ice, snow, slush, water, etc., if allowed to enter the engine core, can cause direct damage to the engine components and/or adversely effect performance. FIG. 3 illustrates what happens to foreign matter which flows into the fan section 18 of the engine 10. Vector 42 is shown to extend axially into a space 44 which is defined by and between adjacent fan blades FB. In FIG. 3 fan blade 46 is a leading fan blade and fan blade 48 is a trailing fan blade. The direction of rotation of the fan section 18 is indicated by the vector U A particle or article of matter traveling vector 42, at velocity V1, will enter the space 44 adjacent the base of blade 46. Owing to the rotation of the fan blade section 18, the particle or object once inside space 44, would travel vector 44 at velocity V2. As illustrated, the particle or object eventually strikes or is impacted by the trailing fan blade 48 this causes the object to be thrown radially outwardly and axially rearwardly by centrifugal force along vector 52 at velocity V3. Eventually the particle or object separates from the fan blade 48 and travels vector 54 at velocity V4. FIG. 2 shows the problem which exists when a particle or object of material travels the path of vectors 42, 50, 52, 54. Such particle or object separates from blade 48 and continues radially outwardly and rearwardly along vector 54 and collides with the aerodynamic lip 38. As shown in FIG. 2, lip 38 deflects the particle or object into the inlet of the engine core 20.

Conventional fan blades twist as they extend radially outwardly from where they are attached to the rotor. In at least the base region of the fan section, conventional fan blades have a substantially constant chord length. The fan blades that are illustrated in FIGS. 1–4 and 6 are conventional fan blades, i.e. they have substantially constant chord lengths in at least their extent from where they are attached to the rotor radially outwardly to where they pass splitter wall 28.

FIG. 4 illustrates the first embodiment of the invention. In this embodiment the lip 38 is essentially eliminated. A new forward boundary 38' for the splitter wall 26 is established rearwardly of the old and contiguous the forward boundary 40 of the stator section 34. This creates an increased length gap or zone 30' through which the vector 54 passes. In other words, the path of travel of the particle or object of matter, following separation of such matter from the fan blade 48, extends through the gap 30'. As a result, the matter is thrown by the fan blade section 18 radially outwardly into the fan duct 14 upstream of boundary 28. As a result such matter does not enter the engine core 20.

FIGS. 5 and 6 relate to other ways of obtaining the result of the fan blade section 18 throwing the foreign matter out into the fan duct 14 so that it does not enter the engine core 20. In the embodiment shown by FIG. 5, the base portions of the fan blades are extended forwardly so as to shift forwardly the location of contact of foreign matter with each trailing fan blade 48'. In FIG. 5 the forward extension of blade 48' is designated 56. In preferred form, the chord length of the fan blades, where they are attached to the rotor bulb 24, is substantially longer than the chord length at that location of a conventional fan blade (e.g. about 150 per cent the normal chord length). Each fan blade, in its extent radially outwardly from rotor bulb 24 to about the diameter of boundary 28 gradually decreases in chord length to where adjacent boundary 28 it is back to the chord length of a conventional fan blade. In this embodiment, the aerodynamic lip 38 may be retained and the forward boundary 28 may be at its conventional location. In accordance with the invention, the forward extension of the base portions of the fan blades may be shortened somewhat from what is illustrated in FIG. 5 and the boundary 28 may be moved rearwardly somewhat but not to such an extent that the lip 38 is eliminated. In other words, an embodiment can be created which is a combination of the two concepts disclosed by FIGS. 4 and 5.

FIGS. 6 and 7 illustrate providing the rotor bulb 24' with blade extensions 58, one for each fan blade. As illustrated, each blade extension 58 may include an outer edge 60 which is of convex curvature in the axial direction. The forward portion of edge 60 essentially emerges into the forward surface of the rotor bulb 24'. Each blade extension 58 rises gradually out from the surface of rotor bulb 24' to a maximum height adjacent the base of its fan blade. Blade extensions 58 may taper somewhat in the radial direction, as shown by FIG. 7. In the axial direction they may be straight, curved, or twisted. The important feature is that they function to shift forwardly the contact location of the fan blades with foreign matter entering into the engine, so as to shift forwardly the vectors 52 and 54 an amount sufficient to place vector 54 forwardly of the forward boundary 28 of splitter wall 38, as is illustrated in FIG. 6

In FIG. 6 the aerodynamic lip 38 is maintained and forward boundary 28 is at its conventional position. However, it is within the purview of the invention to use smaller blade extensions 58 in combination with a partially shortened lip 38.

The centrifuge additions of FIGS. 5–7 may be designed so that they do no flow turning (no work) and hence do not change the operating velocity triangles of the fan hub section. Alternatively, the designer may choose to employ the increased fan hub chord to do more turning and increase the hub work which is generally low because of the low tangential velocity at the fan hub. These particle radial accelerators may be designed into the fan spinner on new or existing engines.

In fact it would be feasible to change engine spinners for "dirty" or "clean" runway operation.

Applicant considers a part of his invention to be the discovery that foreign matter entering between adjacent fan blades is substantially immediately contacted by a blade and thrown radially outwardly, and it is the relationship of the axial spacing of this contact between foreign matter and fan blade and the forward boundary of the splitter wall which is the cause of such matter entering into the engine core in conventional engines.

The embodiments which have been described above are presented for illustration and not limitation. I am only to be limited to the wording of the claims which follow, interpreted in accordance with the rules of Patent Claim Interpretation, including use of the Doctrine of Equivalence.

What is claimed is:

1. A turbofan aircraft engine, comprising an engine core, a fan duct surrounding said engine core, an annular splitter wall positioned radially between the fan duct and the engine core, said splitter wall having a forward boundary, a compressor within the engine core including a forward stator blade section secured to the splitter wall rearwardly of said forward boundary, a rotor including a fan blade section positioned axially forwardly of said forward stator blade section and including fan blades extending radially outwardly into a forward portion of the fan duct, with air passages being defined by and between the fan blades, wherein foreign matter which enters axially into an air passageway between a leading fan blade and an adjacent trailing fan blade, generally at the base of and closely adjacent said leading fan blade, will move into said air passageway, will be contacted by the trailing fan blade and will be propelled by the trailing fan blade generally radially outwardly along an outwardly and rearwardly extending travel path, and the improvement comprising:

said forward boundary of the splitter wall being positioned axially rearwardly from the location of contact of the foreign matter with the trailing fan blade a sufficient distance so that said travel path is located forwardly of the forward boundary of the splitter wall, causing substantially all foreign matter to travel outwardly and rearwardly, forwardly of the splitter wall, into the fan duct and not into the engine core.

2. A turbofan aircraft engine, comprising an engine core, a fan duct surrounding said engine core, an annular splitter wall positioned radially between the fan duct and the engine core, said splitter wall having a forward boundary, a compressor within the engine core including a forward stator blade section secured to the splitter wall rearwardly of said forward boundary, a rotor including a fan blade section positioned axially forwardly of said forward stator blade section and including fan blades extending radially outwardly into a forward portion of the fan duct, with air passages being defined by and between the fan blades, wherein foreign matter which enters axially into an air passageway between a leading fan blade and an adjacent trailing fan blade, generally at the base of and closely adjacent said leading fan blade, will move into said air passageway, will be contacted by the trailing fan blade and will be propelled by the trailing fan blade generally radially outwardly along an outwardly and rearwardly extending travel path, and the improvement comprising:

said forward boundary of the splitter wall being positioned axially rearwardly from the location of contact of the foreign matter with the trailing fan blade a sufficient distance so that said travel path is located forwardly of the forward boundary of the splitter wall, and said foreign matter will travel outwardly, clear of the splitter wall and into the fan duct, and will not be deflected into the engine core by contact with the splitter wall;

wherein the fan blades have a substantially constant chord length in the regions of the fan blade section forwardly of the forward stator blade section, and said forward stator blade section comprises a plurality of stator blades having forward edge boundaries, and wherein the forward boundary of the splitter wall is axially contiguous the forward edge boundaries of the stator blades, and a foreign matter passing axial gap exists between the fan blades and the forward boundary of the splitter wall.

3. A turbofan aircraft engine, comprising an engine core, a fan duct surrounding said engine core, an annular splitter wall positioned radially between the fan duct and the engine core, said splitter wall having a forward boundary, a compressor within the engine core including a forward stator blade section secured to the splitter wall rearwardly of said forward boundary, a rotor including a fan blade section positioned axially forwardly of said forward stator blade section and including fan blades extending radially outwardly into a forward portion of the fan duct, with air passages being defined by and between the fan blades, wherein foreign matter which enters axially into an air passageway between a leading fan blade and an adjacent trailing fan blade, generally at the base of and closely adjacent said leading fan blade, will move into said air passageway, will be contacted by the trailing fan blade and will be propelled by the trailing fan blade generally radially outwardly along an outwardly and rearwardly extending travel path, and the improvement comprising:

said forward boundary of the splitter wall being positioned axially rearwardly from the location of contact of the foreign matter with the trailing fan blade a sufficient distance so that said travel path is located forwardly of the forward boundary of the splitter wall, and said foreign matter will travel outwardly, clear of the splitter wall and into the fan duct, and will not be deflected into the engine core by contact with the splitter wall;

wherein said fan blades have base portions situated axially forwardly of said forward stator blade section and said base portions include forward blade extensions which shift forwardly the location of contact between said foreign matter and the trailing fan blade, to in that manner position the travel path of the foreign matter forwardly of the forward boundary of the splitter wall.

4. The improvement of claim 3, wherein the fan blades, in their extent radially inwardly of the forward boundary of the splitter wall, have progressively increasing chord lengths.

5. A turbofan aircraft engine, comprising an engine core, a fan duct surrounding said engine core, an annular splitter wall positioned radially between the fan duct and the engine core, said splitter wall having a forward boundary, a compressor within the engine core including a forward stator blade section secured to the splitter wall rearwardly of said forward boundary, a rotor including a fan blade section positioned axially forwardly of said forward stator blade section and including fan blades extending radially outwardly into a forward portion of the fan duct, with air passages being defined by and between the fan blades, wherein foreign matter which enters axially into an air passageway between a leading fan blade and an adjacent trailing fan blade, generally at the base of and closely adjacent said leading fan blade, will move into said air passageway, will be contacted by the trailing fan blade and will be propelled by the trailing fan blade generally radially outwardly along an outwardly and rearwardly extending travel path, and the improvement comprising:

said forward boundary of the splitter wall being positioned axially rearwardly from the location of contact of the foreign matter with the trailing fan blade a sufficient distance so that said travel path is located forwardly of the forward boundary of the splitter wall, and said foreign matter will travel outwardly, clear of the splitter wall and into the fan duct, and will not be deflected into the engine core by contact with the splitter wall;

wherein said rotor includes a bulb portion forwardly of the fan blade section, and fan blade forward extensions on said bulb portion.

6. The improvement of claim 5, wherein the fan blade forward extensions have radially outer edges of convex curvature in the axial direction, and have forward portions which substantially merge into the bulb portion.

7. The improvement of claim 6, wherein the fan blades, in their axial extent rearwardly of the fan blade forward extensions, have a substantially constant chord length in their radial extent between the bulb portion of the rotor and the splitter wall.

8. A turbofan aircraft engine, comprising:
an engine core having an axial flow inlet;
a fan duct surrounding said engine core;
an annular splitter wall positioned radially between the fan duct and the engine core, said splitter wall having a forward boundary;
a rotor including a fan blade section positioned axially forwardly of the engine core inlet and including fan blades extending radially outwardly into a forward portion of the fan duct, with air passages being defined by and between the fan blades, wherein foreign matter which enters axially into an air passageway between a leading fan blade and an adjacent trailing fan blade, generally at the base of and closely adjacent said leading fan blade, will move into the air passageway and then be contacted by the trailing fan blade, and will then be propelled by the trailing fan blade generally radially outwardly, and will travel along a radially outwardly and rearwardly extending travel path; and said forward boundary of the splitter wall being positioned axially rearwardly from the location of contact of the foreign matter with the trailing fan blade, generally at the base of said leading fan blade, a sufficient distance so that said travel path of foreign matter is located forwardly of the forward boundary of the splitter wall, causing substantially all foreign matter to travel outwardly and rearwardly forwardly of the splitter wall, into the fan duct and not into the engine core inlet.

* * * * *

UNITED STATES PATENT AND TRADEMARK OFFICE
CERTIFICATE OF CORRECTION

PATENT NO: 5,431,535

DATED: July 11, 1995

INVENTOR(S): Frank Klujber

It is certified that error appears in the above-identified patent and that said Letters Patent is hereby corrected as shown below:

In claim 8, column 8, line 30, there is a comma after "rearwardly".

Signed and Sealed this

Nineteenth Day of March, 1996

Attest:

BRUCE LEHMAN

Attesting Officer                Commissioner of Patents and Trademarks

(12) REEXAMINATION CERTIFICATE (4249th)
United States Patent
Klujber

(10) Number: US 5,431,535 C1
(45) Certificate Issued: Jan. 9, 2001

(54) FOREIGN MATTER DIVERTER SYSTEMS FOR TURBOFAN ENGINES

(75) Inventor: Frank Klujber, Redmond, WA (US)

(73) Assignee: The Boeing Company, Seattle, WA (US)

Reexamination Request:
No. 90/005,406, Jun. 25, 1999

Reexamination Certificate for:
Patent No.: 5,431,535
Issued: Jul. 11, 1995
Appl. No.: 07/583,490
Filed: Sep. 17, 1990

Certificate of Correction issued Mar. 19, 1996.

Related U.S. Application Data

(63) Continuation of application No. 07/446,293, filed on Dec. 5, 1989, now abandoned.

(51) Int. Cl.$^7$ .............................. F03B 11/08; F04D 29/70
(52) U.S. Cl. ........................................ 415/121.2; 415/151
(58) Field of Search ............................. 415/121.2, 182.1, 415/183, 77, 185, 191, 208.1, 218.1, 219.1, 914

(56) References Cited

PUBLICATIONS

J.M.S. Keen, "Rolls–Royce Limited", Feb. 1981.*
Terry Savage, "Aircraft Engineering", May 1984.*
The 737–300 Regional Operator Conference, Nov. 1988.*

* cited by examiner

*Primary Examiner*—Hoang Nguyen

(57) ABSTRACT

The axial gas (30) between a turbofan section (18) in a turbofan aircraft engine (10) is enlarged so that foreign matter thrown radially outwardly by the fan blades (48) will travel vectors (52, 54) which are located forwardly of the forward boundary (28) of the splitter wall (26). This results in the foreign matter being expelled through the fan duct (14) the engine (10), preventing it from entering into the engine core (20). Forward extensions (56, 58) of the fan blades can also be used for shifting the vectors (52, 54) forwardly. Smaller forward extensions (56, 58) can be used in combination with a partially widened gas (30) for positioning the vectors (52, 54) forwardly of the splitter wall forward boundary (28).

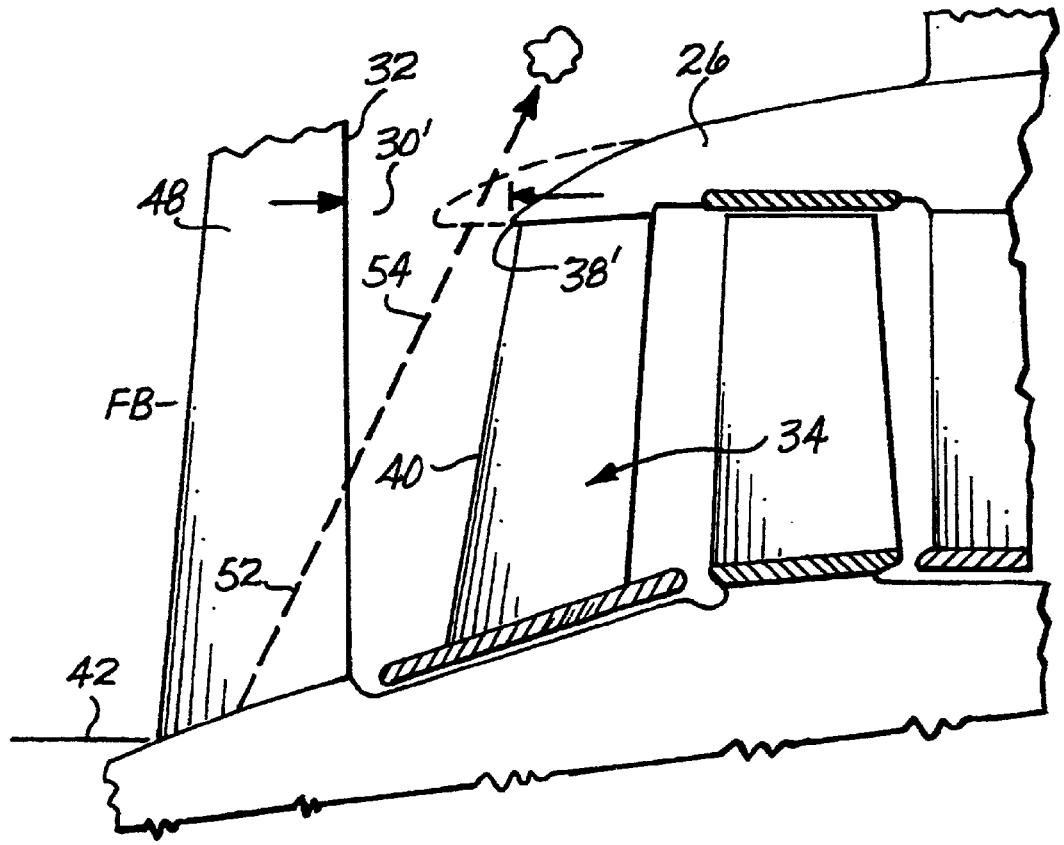

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3–7 is confirmed.

Claims 1, 2 and 8 are determined to be patentable as amended.

1. A turbofan aircraft engine, comprising an engine core, a fan duct surrounding said engine core, an annular splitter wall positioned radially between the fan duct and the engine core, said splitter wall having a forward boundary, a compressor within the engine core including a forward stator blade section secured to the splitter wall rearwardly of said forward boundary, a rotor including a fan blade section positioned axially forwardly of said forward stator blade section and including fan blades extending radially outwardly into a forward portion of the fan duct, with air passages being defined by and between the fan blades, wherein foreign matter which enters axially into an air passageway between a leading fan blade and an adjacent trailing fan blade, generally at the base of and closely adjacent said leading fan blade, will move into said air passageway, will be contacted by the trailing fan blade and will be propelled by the trailing fan blade generally radially outwardly along an outwardly and rearwardly extending travel path, and the improvement comprising:

said forward boundary of the splitter wall being positioned axially rearwardly from the location of contact of the foreign matter with the trailing fan blade a sufficient distance so that said travel path is located forwardly of the forward boundary of the splitter wall, causing substantially all foreign matter to travel outwardly and rearwardly, forwardly of the splitter wall, *along or ahead of said travel path*, into the fan duct and not into the engine core.

2. A turbofan aircraft engine, comprising an engine core, a fan duct surrounding said engine core, an annular splitter wall positioned radially between the fan duct and the engine core, said splitter wall having a forward boundary, a compressor within the engine core including a forward stator blade section secured to the splitter wall rearwardly of said forward boundary, a rotor including a fan blade section positioned axially forwardly of said forward stator blade section and including fan blades extending radially outwardly into a forward portion of the fan duct, with air passages being defined by and between the fan blades, wherein foreign matter which enters axially into an air passageway between a leading fan blade and an adjacent trailing fan blade, generally at the base of and closely adjacent said leading fan blade, will move into said air passageway, will be contacted by the trailing fan blade and will be propelled by the trailing fan blade generally radially outwardly along an outwardly and rearwardly extending travel path, and the improvement comprising:

said forward boundary of the splitter wall being positioned axially rearwardly from the location of contact of the foreign matter with the trailing fan blade a sufficient distance so that said travel path is located forwardly of the forward boundary of the splitter wall, and said foreign matter will travel outwardly, clear of the splitter wall, *along or ahead of said travel path*, and into the fan duct, and will not be deflected into the engine core by contact with the splitter wall;

wherein the fan blades have a substantially constant chord length in the regions of the fan blade section forwardly of the forward stator blade section, and said forward stator blade section comprises a plurality of stator blades having forward edge boundaries, and wherein the forward boundary of the splitter wall is axially contiguous the forward edge boundaries of the stator blades, and a foreign matter passing axial gap exists between the fan blades and the forward boundary of the splitter wall.

8. A turbofan aircraft engine, comprising:

an engine core having an axial flow inlet;

a fan duct surrounding said engine core;

an annular splitter wall positioned radially between the fan duct and the engine core, said splitter wall having a forward boundary;

a rotor including a fan blade section positioned axially forwardly of the engine core inlet and including fan blades extending radially outwardly into a forward portion of the fan duct, with air passages being defined by and between the fan blades, wherein foreign matter which enters axially into an air passageway between a leading fan blade and an adjacent trailing fan blade, generally at the base of and closely adjacent said leading fan blade, will move into the air passageway and then be contacted by the trailing fan blade, and will then be propelled by the trailing fan blade generally radially outwardly, and will travel along a radially outwardly and rearwardly extending travel path; and said forward boundary of the splitter wall being positioned axially rearwardly from the location of contact of the foreign matter with the trailing fan blade, generally at the base of said leading fan blade, a sufficient distance so that said travel path of foreign matter is located forwardly of the forward boundary of the splitter wall, causing substantially all foreign matter to travel outwardly and rearwardly, forwardly of the splitter wall, *along or ahead of said travel path*, into the fan duct and not into the engine core inlet.

\* \* \* \* \*